United States Patent [19]

Ng et al.

[11] Patent Number: 5,207,397
[45] Date of Patent: May 4, 1993

[54] ROTATABLE NOSE AND NOSE BOOM STRAKES AND METHODS FOR AIRCRAFT STABILITY AND CONTROL

[75] Inventors: Tsun-Ming T. Ng, San Pedro; Bert F. Ayers, Torrance, both of Calif.

[73] Assignee: Eidetics International, Inc., Torrance, Calif.

[21] Appl. No.: 535,736

[22] Filed: Jun. 8, 1990

[51] Int. Cl.$^5$ .................... F42B 10/00; B64C 39/12; B64C 23/02
[52] U.S. Cl. ............................. 244/45 A; 244/329; 244/206
[58] Field of Search ............... 244/3.24, 3.28, 3.29, 244/45 A, 130, 199, 204, 206, 75 R, 91, 89

[56] References Cited

U.S. PATENT DOCUMENTS

| 4,010,920 | 3/1977 | Farner | 244/45 A X |
| 4,378,922 | 4/1983 | Pierce | 244/199 |
| 4,786,009 | 11/1988 | Rao et al. | 244/45 A X |

FOREIGN PATENT DOCUMENTS 982779  2/1965  United Kingdom .................. 244/89

OTHER PUBLICATIONS

"Enhanced Departure/Spin Recover of Fighter Aircraft through Control of the Forebody Vortex Orientation", W. A. Moore, A. M. Skow & D. J. Lorincz, Northrop Corp., AIAA 18th Aerospace Sciences Meeting, Pasadena, Calif. Jan. 14-16, 1980.
"A Survey of Analytical & Experimental Techniques to Predict Aircraft Dynamic Characteristics at High Angles of Attack", A. M. Skow & A. Titiriga, Jr., Northrop Corp., The Fluid Dynamics Panel Mtg. on Dynamic Stability Parameters, Athens, Greece, May 22-24, 1978.
"Application of Forebody Blowing for Vortex Manipulation of the F-16", T. Terry Ng, Eidetics International, TR 90-001, Jan. 1990.
"Aerodynamic Control Using Forebody Strakes", T. T. Ng, & G. N. Malcolm, Eidetics International, Inc., 29th Aerospace Sciences Meeting, Reno, Nev., Jan. 7-10, 1991.
"Forebody Vortex Control with Miniature Rotatable Nose5Boom Strakes", C. Suarez, G. Malcolm & T. Ng, 30th Aerospace Sciences Meeting & Exhibit, Reno, Nev., Jan. 6-9, 1992.

Primary Examiner—Joseph F. Peters, Jr.
Assistant Examiner—Virna Lissi Ansley
Attorney, Agent, or Firm—Blakely, Sokoloff, Taylor & Zafman

[57] ABSTRACT

Methods and apparatus for stability and maneuver control using rotatable nose strakes to control forebody vortices at medium to high angles of attack are disclosed. In one form, small left and right nose strakes are supported on a member or members forming the forward most contours of the forebody. Supporting of the two strakes on a single member allows rotation of the two in unison, the angular position thereof controlling the asymmetry of the forebody vortices at higher angles of attack, while support of each strake on a separate forebody nose member allows individual strake control for the same purpose. In another embodiment, the strakes may be mounted on a nose boom for rotation about the axis of the nose boom, whereby rotation of the strakes about the nose boom axis affects the development of the forebody vortices and the asymmetry thereof. Various embodiments and methods of operation thereof are disclosed.

41 Claims, 1 Drawing Sheet

ROTATABLE NOSE AND NOSE BOOM STRAKES AND METHODS FOR AIRCRAFT STABILITY AND CONTROL

This invention was made with government support under Contract NAS2-13155 awarded by the National Aeronautic & Space Administration. The government has certain rights in this invention.

BACKGROUND OF THE INVENTION

1. Field of the invention.

The present invention relates to the field of airborne vehicle stability and control.

2. Prior Art.

A key technology to increase the overall capability of the airplane is aerodynamic control. The flight envelopes of current high performance aircraft have been limited at least in part by controllability problems at high angles of attack, typically represented by sudden departures in roll and yaw and, in some cases, by nose pitch-up or deep stall. Reduced controllability places undesirable limits on the maneuverability of the aircraft but, even worse, often leads to unrecoverable flight modes such as spins. It is therefore desirable to extend the angle of attack range for controllable flight by locally controlling the vortex flow field around the aircraft with nonconventional techniques.

The flow field around a modern high performance aircraft at moderate to high angles of attack is dominated by vortices. One of the problems on aircraft with slender forebodies such as proposed for the National Aerospace Plane is the presence of large uncontrollable yawing moments generated by asymmetric vortices on the forebody at high angles of attack, even at zero sideslip angles. The inability to overcome these large moments with conventional control surfaces has led to a number of studies to search for alternate methods of controlling the vehicle. One of the potential schemes is to effectively utilize the vortices that are the cause of the problem.

Research experiments on a series of generic high performance aircraft configurations have investigated several methods of controlling the forebody vortices including movable forebody strakes and blowing on the forebody surface. See for instance "Enhanced Controllability Through Vortex Manipulation on Fighter Aircraft at High Angles of Attack", Malcolm, G. N. and Skow, A. M., AIAA Paper No 86-22877-CP, August 1986. The typical effectiveness of the vertical tail and rudder to control the yawing moment falls off as the angle of attack increases because the vertical tail gradually becomes enveloped in the wake of the wing and fuselage. At the time the rudder effectiveness is decreasing, the asymmetric forces of the forebody vortices are increasing. If the vortices can be controlled, then they can be used for generating a controlled yawing moment to replace the lost yaw controllability from the rudder.

A number of studies have previously been conducted to investigate the effects of forebody strakes and forebody blowing. The use of forebody strakes has been shown to be an effective method of forcing naturally occurring asymmetric vortices at high angles of attack to be symmetric or nearly symmetric and to therefore eliminate the large forebody side forces and resulting yawing moments at zero sideslip. For reference see (1) "Asymmetric Aerodynamic Forces on Aircraft Forebodies at High Angles of Attack—Some Design Guides", Chapman, G. T., Keener, E. R., and Malcolm, G. N., AGARD CP-199, Conference on Stall/Spin Problems of Military Aircraft, Rhode Saint Genese, Belgium, November 1975, (2) "A Survey of Analytical and Experimental Techniques to Predict Aircraft Dynamic Characteristics at High Angles of Attack", Skow, A. M. and Titiriga, A., AGARD CP-235 Conference on Dynamic Stability Parameters, Athens, Greece, May 1975, (3) "Analysis of Wind Tunnel Data Pertaining to High Angle of Attack Aerodynamics", Headley, J. W., AFFDL-TR-78-94, Volume I, July 1978, and (4) "Exploratory Studies of Actuated Forebody Strakes for Yaw Control at High Angles of Attack", Murri, D. G. and Rao, D. M., AIAA Paper No. 87-2557-CP, August 1987). Use of asymmetrically-deployed forebody strakes has been investigated (See "Exploratory Studies of Actuated Forebody Strakes for Yaw Control at High Angles of Attack", Murri, D. G. and Rao, D. M., AIAA Paper No. 87-2557-CP, August 1987) for possible application to controlling the yawing moments. Investigations of forebody blowing techniques to control the forebody vortex orientation have also been conducted in both water and wind tunnel experiments where asymmetric forebody vortices were switched in orientation by blowing under the high vortex. For reference see (1) "Forebody Vortex Blowing—A Novel Concept to Enhance the Departure/Spin Recovery Characteristics of Fighter Aircraft", Skow, A.,.Moore, W. A. and Lorincz, D. J., AGARD CP-262, Conference on Aerodynamics of Controls, Naples, Italy, May 1979, (2) "Control of the Forebody Vortex Orientation by Asymmetric Air Injection Application to Enhance Departure/Spin Recovery", Moore, W. A., Skow, A. M., and Lorincz, D. J., AIAA Paper No. 80-0173, AIAA 18th Aerospace Sciences Meeting, Pasadena, Calif., January 1980, (3) "Control of Forebody Three-Dimensional Flow Separation, Peake, D. J., and Owen, F. K., AGARD-CP-262-15, May 1979, and "Control of Forebody Vortex Orientation to Alleviate Side Forces", Peake, D. J., Owen, F. K., and Johnson, D. A., AIAA-80-0183, January 1980, (4) "Development of Non-Conventional Control Methods for High Angle of Attack Flight Using Vortex Manipulation," Malcolm, G. N., Ng, T. T., Lewis, L. C., and Murri, D. G., AIAA Paper 89-2192, AIAA 7th Applied Aerodynamics Conference, Seattle, WA, July 31, August 1-2, 1989, (5) "Application of Forebody Blowing for Vortex Manipulation on the F-16," Ng, T. T., Eidetics International Report, 1989, and (6) "Aerodynamic Effects of Asymmetric Vortex Shedding From Slender Bodies", Ericsson, L. E. and Reding, J. P., AIAA Paper No. 85-1797, AIAA 12th Atmospheric Flight Mechanics Conference, Snowmass, CO, August 19-21, 1985.

As stated before, forebody strakes have been shown to be an effective method of forcing naturally occurring asymmetric vortices at medium to high angles of attack to be symmetric or nearly symmetric, thereby potentially favorably affecting aircraft stability, but not themselves directly providing any enhancement of aircraft control. Actuated forebody strakes, on the other hand, offer the potential for use in aircraft control. The difficulty with such strakes however, is that they tend to be complex, require hinge support structure in the forebody where no such structure now typically exists, and may require substantial actuating forces, particularly if fast response as may be required for aircraft control is to be obtained. Further, the structure, actuators, etc. required may preclude placement of the same forward of the radar, thereby forcing a further aft placement of the strakes, requiring larger strakes, increased structure and actuators, etc.

BRIEF SUMMARY OF THE INVENTION

Methods and apparatus for stability and maneuver control using rotatable nose strakes to control forebody vortices at medium to high angles of attack are disclosed. In one form, small left and right nose strakes are supported on a member or members forming the forward most contours of the forebody. Supporting of the two strakes on a single member allows rotation of the two in unison, the angular position thereof controlling the asymmetry of the forebody vortices at higher angles of attack, while support of each strake on a separate forebody nose member allows individual strake control for the same purpose. In another embodiment, the strakes may be mounted on a nose boom for rotation about the axis of the nose boom, whereby rotation of the strakes about the nose boom axis affects the development of the forebody vortices and the asymmetry thereof. Various embodiments and methods of operation thereof are disclosed.

DETAILED DESCRIPTION OF THE INVENTION

Figure 1:
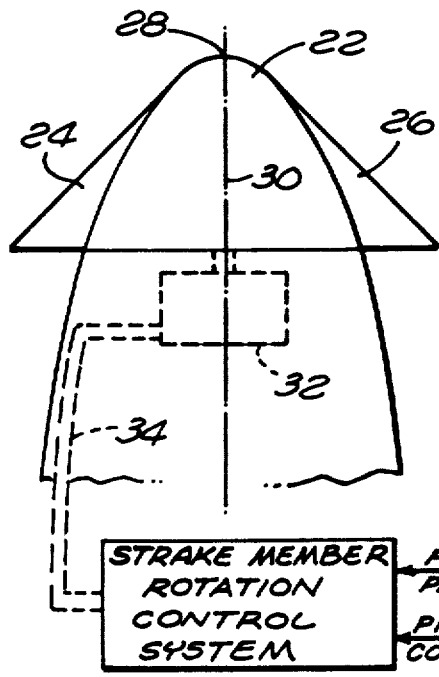
FIG. 1 is a top schematic view of an aircraft forebody showing a rotatable forebody nose tip member having a pair of strakes thereon.
Figure 2:
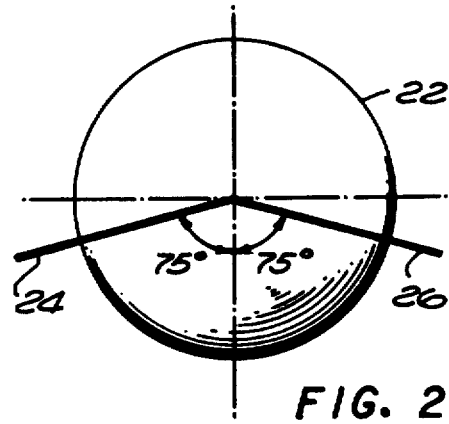
FIG. 2 is a front view of the rotatable nose member and strakes of FIG. 1.

First referring to FIGS. 1 and 2, a top view and a rear view of one embodiment of the present invention may be seen. In particular, in FIG. 1 a top view of an F/A-18 forebody 20 is shown with the forwardmost nose region thereof comprising a member 22 having strakes 24 and 26 thereon. The strakes are mounted to member 22 not diametrically opposite to each other, but rather with each mounted 15 degrees downward from the horizontal as may be seen in the view thereof in FIG. 2. In this particular embodiment the strakes extend back approximately 6.8 inches from the forwardmost nose point of the forebody contour, with each strake extending outward from the forebody approximately 1.27 inches at the aft portion thereof. These dimensions may be seen in the illustration of FIG. 1. Except for the strakes 24 and 26 thereon, member 22 generally conforms to the shape of the forebody 20, continuing the contour thereof to the forwardmost nose point 28 in a manner so as to substantially duplicate the conventional F/A-18 nose contour.

As shown schematically in FIG. 1, the nose member 22 on which the strakes 24 and 26 are integrally mounted is itself mounted for rotation about axis 30 generally coincident with the axis of the forebody contour. A drive motor 32 is provided to drive member 22 in rotation, the motor 32 being provided with command power through a connection 34 to a control system yet to be described. The motor 32 of course can be a relatively small motor with or without gear reduction, as member 22 is relatively small and the torque required to rotate the same is itself not that large. Also, while fairly quick response is desired, and a full 360 degree rotation capability might be provided, the typical angular range of motion that might be commanded at any time will typically be something substantially less than 45 degrees. While the motor 32 may of course be an electric motor, other types of motors might also be used, and may be more advantageous in applications wherein minimum obstruction of a forward looking radar is desired, such as by way of example, some form of direct drive hydraulic motor or even a pneumatic motor, as member 22, strakes 24 and 26 thereon and at least many of such motor parts may be made relatively radar transparent. Similarly power, whether electric, hydraulic or pneumatic, or in any other form provided in line 34, might itself drive member 22 to the desired angular position, though more typically some form of position feedback would be provided through line 34 also, particularly when forward looking radar is used, to minimize the amount of structure and control equipment forward of the radar antenna.

Also shown in FIG. 1 is a strake member rotation control system 36 which provides the control for the angular position of member 22 and the strakes in unison therewith. Typically the control system 36 will receive inputs from various sources and control the angle of member 22 and thus the strakes thereon in response thereto. Normally these inputs will include one or more flight parameters, including angle of attack, as the system is only functional at higher angles of attack. Accordingly, at low angles of attack the strakes would be driven to the symmetrical position illustrated in FIG. 2. At high angles of attack however, the control system generally would be responsive to angle of attack, sideslip angle, and more particularly, yaw rate. Yaw rate is particularly important in aircraft having forebody configurations which naturally have an unsymmetrical vortex pattern at high angles of attack, typically forebodies which are round or near round in cross section, as yaw rate provides an early indication of the nature of the existing vortex asymmetry, providing an early indication of the change needed in the strake angles to prevent large yaw angles and large yaw rates from developing and to stabilize the vehicle about zero or some other commanded yaw angle. In that regard, normally the forebody contribution to the aircraft yawing moment depends upon the degree of asymmetry of the vortices shed by the forebody at high angles of attack, at least at 0 yaw angle. However, the forebody, being forward of the vehicle center of gravity, also has a contribution to the aircraft yawing moment, a destabilizing contribution, due to yaw angle because of the increasing side forces on the forebody with increasing yaw angles, even if the forebody vortex pattern is symmetrical. Thus the strake member rotation control system could, in one form, be responsive to yaw angle and yaw rate to rotate the strakes to command an unsymmetrical vortex pattern counteracting the yaw moment due to the yaw angle, effectively driving the yaw rate to zero to hold a yaw angle as may be commanded by the pilot. Such a control operates in a predetermined manner based on current flight conditions, the rotating strakes essentially being used for stability purposes rather than control.

As shown in FIG. 1, the strake member rotation control system 36 also has as inputs thereto the pilot commands, typically the joy stick and rudder commands. This allows the control system to respond not only to current flight conditions but to the current flight commands also, and more particularly to the difference between the current flight commands and the current flight conditions, allowing the vortex control provided by the rotatable strakes to provide a substantial control function as well as a stability function. Here too, of course, the system would respond to yaw angle and yaw rate, more particularly the difference between current yaw angle and commanded yaw angle to create a yaw rate to minimize that difference in a minimum time and to hold a steady commanded yaw angle.

Figure 3:
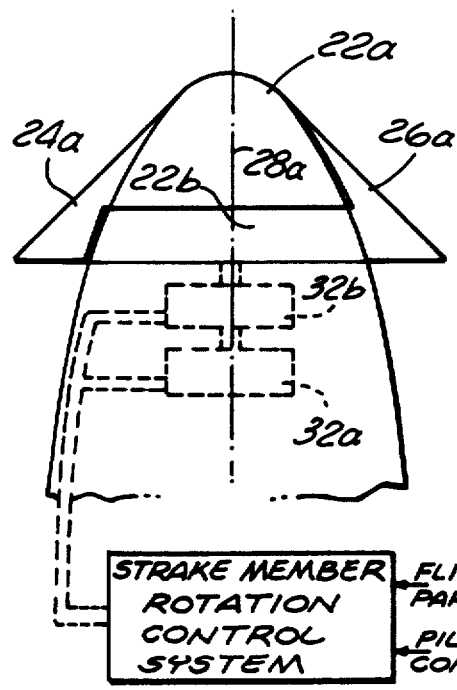
FIG. 3 is a top view of an aircraft forebody showing a pair of rotatable forebody nose members, each carrying one of a pair of forebody nose tip strakes.

Now referring to FIG. 3, an alternate embodiment of the present invention may be seen. This embodiment differs from the embodiment of FIG. 1 primarily by the fact that the nose member 22 of FIG. 1 is divided into first and second nose members 22a and 22b so that each nose member is separately rotatable about axis 28a. Strake 24a is integral with nose member 22a, whereas strake 26a is integral with nose member 22b, so that the independent rotation of each of the two nose members will cause independent rotation of the respective strake attached thereto. The two nose members 22a and 22b, of course, together define the forwardmost contour of the forebody 20a, though are independently rotatable by motors 32a and 32b, respectively, schematically shown in the figure. Obviously with the configurations shown, the allowable motion for either strake will be limited by the current position of the other strake, though within the normal range of desired control of strake position, each may be moved or controlled in position totally independent of the other. In that regard, as used herein and in the appended claims, the two strakes are independently controllable even though one might have a fixed relationship or relationships between the motion of the two strakes, which in turn may be constant or varied with flight conditions and/or pilot commands. By way of example, at low angles of attack the two strakes may be commanded to the position shown in FIG. 1, with one strake being left in that position and the other strake being varied in position or vice versa to effect left and right control when needed. Similarly, the basic anhedral angle of the strakes might be varied with angle of attack and sideslip or both, with the strake angles then being varied in unison under the given flight conditions for stability and control purposes. Thus the ability to independently control the strake angles allows optimizing the strake position and movement to provide optimum performance under various operating conditions as may be suggested by pretesting of the airframe and forebody configuration of the aircraft.

Water tunnel experiments have been performed on a six percent scale F/A-18 Model using the rotatable forebody nose strakes of the dimensions hereinbefore set forth, in proportion to course, in accordance with the size of the model. As so proportioned, the strakes had a length of about one tenth of the length of the model radome and a height which was about one fifth of the local forebody diameter. Overall the nose tip strakes provided effective controls on the forebody vortices, with the control being effective over wide ranges of sideslip (zero degrees to over twenty degrees) and angles of attack (thirty degrees to sixty-five degrees and higher). The vortices could be manipulated into different patterns by rotating the strakes to different angular positions. The maximum vortex asymmetry, especially at sideslip conditions, appeared to be higher than can be induced with many other control methods such as blowing.

The rotatable nose tip strakes function by altering in effect the geometry of the forebody apex. The rotatable forebody nose strakes of the present invention are intended to influence directly only a small region near the tip of the forebody where the flow plays a predominant role in controlling the vortex position. The larger strakes, supported on, hinged to and deflectable with respect to the forebody of the prior art, directly affect a much larger region mainly aft of the forebody nose tip. These prior art large, deflectable strakes essentially dictate that a large portion of the forebody flow separates at the leading edges of the strakes. The small nose tip strakes of the present invention, on the other hand, behave much like the vortex generators on many existing aircraft wings. One of the functions of the strakes is to generate small vortices which energize the boundary layer further aft to delay flow separation. Thus, in this case the yawing moment generated by a single small nose tip strake can be towards the side with the strake, which is exactly opposite the case of a large strake which always generates a yawing moment away from the side with the strake thereon. While the prior art deflectable strake has a fixed hinge line, the nose tip strakes of the present invention are free to rotate to any angular position. This allows the nose tip strakes to be positioned more optimally relative to the forebody vortices for a wider range of angles of attack and sideslip, especially if the left and right strakes can be made to rotate independently.

Figures 4, 5:
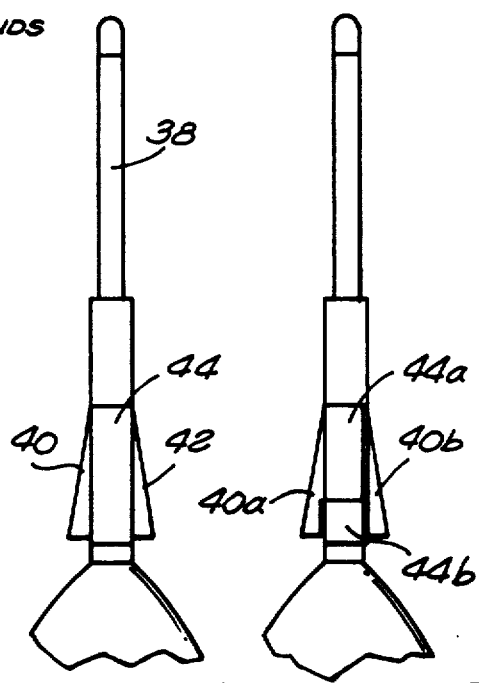
FIG. 4 is a top view of an aircraft forebody and forebody boom illustrating a rotatable boom member with small boom strakes thereon.
FIG. 5 is a view similar to FIG. 4 illustrating a pair of rotatable boom members, each having one of a pair of strakes thereon.

Now referring to FIG. 4, rotatable strakes mounted not on a rotatable forebody nose member, but rather on a forebody nose boom 38 may be seen. As shown therein, strakes 40 and 42 are mounted on strake support 44, controllably rotatable about the axis of the nose boom 38. In the embodiment shown in FIG. 4, two strakes, 40 and 42, are both supported by the single member 44 and are thereby rotatable in unison therewith, much like the forebody nose strakes of FIGS. 1 and 2. In FIG. 5, however, the left strake 40a is mounted on rotatable nose boom member 44a, whereas the right strake 40b is mounted on rotatable nose boom member 44b. In operation, the rotatable nose boom strakes are controlled in a manner similar to the forebody nose strakes, though their function is somewhat different therefrom. In particular, the sensitivity of the forebody vortices to external disturbances is well documented. On the F16 aircraft, one source of such disturbances is the nose boom. In a previous study, two different forebody configurations were tested, one with the nose boom and one without. The flow around the forebody for each of these two configurations was studied for an angle of attack range from fifteen degrees to sixty-five degrees. Without the nose boom, the vortex flow remains visually symmetric from an angle of attack of twenty degrees to sixty-five degrees. With the nose boom in place, however, the forebody vortex flow becomes visibly asymmetric for angles of attack above forty degrees. Since the asymmetry is only present when the nose boom is in place, it is evidently a result of the influence of the asymmetric wake of the nose boom on the forebody vortices.

The nose boom on the F16 resembles a slender cylindrical body. When such a body is pitched through an angle of attack range, it experiences four distinct flow regimes. At low angles of attack the flow is dominated by the axial component and stays attached. The main effect of the crossflow is to create a thick boundary layer on the leeward side. At intermediate angles of attack the flow separates to form a steady and symmetric vortex pair. At intermediate to high angles of attack the axial flow is still sufficiently strong to maintain a steady vortex pair, though the same may become asymmetric. At very high angles of attack the axial component can no longer maintain a steady vortex pair and the vortices are shed in the form of a Karman vortex street. Thus, the wake of the nose boom is naturally asymmetric over a range of angle of attack.

Previous studies have also shown that the forebody vortex flow is especially sensitive to any asymmetries and disturbances at the apex region, and that the F16 nose boom wake produces a rather strong disturbance at the apex region which strongly influences the forebody vortex pattern. It is this strong influence which the present invention takes advantage of, namely by controlling the nose boom vortices and thus controlling the forebody vortices. In model tests of the present invention, it has been found that nose boom strakes provide effective controls on the forebody vortices for angles of attack from approximately twenty-five degrees to sixty degrees, the highest angle of attack tested. It was found that the forebody vortices can be manipulated progressively and continuously from a symmetric pattern to a highly asymmetric pattern by rotating the nose boom strakes to different angular positions. Thus, yawing moments could be generated progressively (monotonically) to provide different magnitudes of control.

Many high performance aircraft have forebodies which are not defined by surfaces of revolution but rather which are flattened either into an oval shape or which have a hard chine such as the SR71 forebody. In such cases wherein the strakes are mounted on a forebody nose member or nose members, the forebody members may still generally continue the contour of the forebody, either by having the forebody fare down to a circular cross section at the forebody members, or alternatively by having the forebody members themselves not have a circular cross section in which case some discontinuity in cross section will occur when the forebody nose members are rotated from the zero angle attack positions. In that regard, a slight discontinuity or a relatively sudden step in cross section should not be of such great significance because of the relatively small size of the forebody cross section in that region and for the further reason that operation at high angles of attack wherein the forebody nose members would be rotated from their quiescent positions represents only a small part of the flight profile of the aircraft.

Non-circular forebodies, particularly flattened forebodies and forebodies having a hard chine, generally have a symmetrical or more symmetrical shedding vortex pattern at high angles of attack than forebodies of circular cross section. The present invention may have particular application to such non-circular forebodies, as the mode of operation of the invention and results achieved thereby can be substantially affected by the characteristics of the vortices inherent in the particular forebody configuration used. By way of example, as stated before, circular forebodies generally having an unsymmetrical vortex pattern at high angles of attack, with both the possible left side high, right side low and left side low, right side high vortex patterns being stable. Thus, for stability and/or control purposes, the nose or nose boom strakes of the present invention might be controlled in a bang-bang manner so that the vortex pattern oscillates substantially between the two stable vortex patterns with a duty cycle controlled to provide the stability or control function desired. Alternatively, the nose members and strakes thereon or the boom strakes may be dithered about some angle at a substantial frequency so that the net effect of the vortex pattern is closer to a symmetrical or more nearly symmetrical pattern, or a pattern controlled in asymmetry much more than is characteristic of the basic forebody configuration. Ideally one would like the asymmetry of the vortices to be a linear function of the angles of rotation of the strakes, or better yet for the forebody contribution to the aircraft yawing moment to be a linear function of the angles of rotation of the strakes. It would be highly useful if the asymmetry of the vortices, or more preferably if the forebody contribution to the aircraft yawing moment, was at least a monotonic function of the angles of rotation of the strakes, though for forebodies of a circular cross section this might not be achieved at very high angles of attack without an excessive high frequency dither of the strakes superimposed upon the angles of rotation thereof. However, as the forebody is flattened from a circular cross section, the asymmetry of the vortices and the forebody contribution to the aircraft yawing moment should become a monotonic function of the angles of rotation of the strakes, either with a reasonable dither superimposed thereon or even with no dither required, depending upon the nature and extent of the flattening. In a hard chine forebody wherein the vortex pattern is naturally symmetrical, the desired monotonic functions should be achievable even without dither, though the degree of contribution to stability or control which could be achieved utilizing the present invention may be limited if the vortices cannot be driven sufficiently asymmetrical, particularly with strakes of reasonable size.

There has been described herein new and unique methods and apparatus for enhancing the stability and control of airborne vehicles at high angles of attack which provide rapid response, require very little power, can be added to existing aircraft configurations without requiring structural changes thereto and which have no significant effect on the low angle of attack operation thereof. The strakes of the present invention have certain advantages over deployable forebody strakes with a fixed hinge line on the forebody and over forebody blowing from fixed nozzles. In particular, the forebody blowing and forebody strakes operate essentially by controlling the natural forebody flow separation. Since the natural separation point changes with the angle of attack, the positioning of the blowing ports or the strakes is necessarily a compromise. For instance, a fixed position optimized for high angles of attack may not be optimal for moderate angles of attack. For the nose tip strakes, the principle of operation is the relocation of the strakes. This allows a much greater degree of freedom in positioning, especially in the angular direction at which the nose tip strakes can be rotated, namely to the optimal position relative to the natural separation/forebody vortices at medium to any angle of attack. Thus, the control can be effective over a wider range of angle of attack compared with other control methods. Also compared with forebody strakes hinged to the forebody, the nose tip strakes are likely to be much smaller in size, providing a very small and light weight system whose interference with radar operation is very small compared with that of the forebodied strakes. Furthermore, due to their size being potentially very small, the loading on the strakes should also be small so that the strakes can be constructed with nonmetallic materials.

While the present invention has been disclosed and described with respect to preferred embodiments thereof, it will be understood by those skilled in the art that various changes in form and detail may be made therein without departing from the spare end scope thereof.

We claim:

1. A method of providing or enhancing control of an aircraft at high angles of attack by controlling the aircraft forebody vortices comprising the steps of:
   (a) providing a pair of strakes on the nose of the aircraft forebody, both strakes being rotatable about a common axis that is approximately aligned with the longitudinal axis of the aircraft forebody, and
   (b) controlling the angles of rotation of the strakes about said axis, whereby the asymmetry of the forebody vortices and the forebody forces resulting therefrom may be controlled.

2. The method of claim 1 wherein the strakes are mounted on a forebody nose member mounted on the forebody for rotation about said axis and forming the forwardmost portion of the forebody contour, whereby in step (b), the angle of the pair of strakes is controlled in unison.

3. The method of claim 1 wherein the strakes are each mounted on a separate forebody nose member mounted for rotation about said axis and together forming the forwardmost portions of the forebody contour, whereby in step (b), the angle of each of the pair of strakes may be separately controlled.

4. The method of claim 1 wherein in step (b), the angles of the strakes are controlled in a predetermined manner based on current flight conditions.

5. The method of claim 1 wherein in step (b), the angles of the strakes are controlled in a predetermined manner based on current flight conditions including a yaw parameter.

6. The method of claim 5 wherein the yaw parameter is yaw rate.

7. The method of claim 1 wherein in step (b), the angles of the strakes are controlled in a predetermined manner based at least in part on current flight commands.

8. The method of claim 7 wherein in step (b), the angles of the strakes are controlled as part of a feedback loop based at least in part on the difference in current flight commands and current flight conditions.

9. The method of claim 7 wherein in step (b), the angles of the strakes are controlled as part of a feedback loop based at least in part on the difference in current flight commands and current flight conditions including a yaw parameter.

10. The method of claim 9 wherein the yaw parameter is yaw rate.

11. The method of claim 1 wherein in step (b), the angles of the strakes are dithered.

12. The method of claim 1 wherein in step (a), the size and location of the strakes are selected so that the degree of asymmetry of the vortices is a monotonic function of the angles of rotation of the strakes.

13. The method of claim 1 wherein in step (a), the size and location of the strakes are selected so that the forebody contribution to the aircraft yawing moment is a monotonic function of the angles of rotation of the strakes.

14. A method of providing or enhancing control of an aircraft at high angles of attack by controlling the aircraft forebody vortices comprising the steps of:
   (a) providing a pair of strakes on a nose boom on the aircraft forebody, the pair of strakes being rotatable about a common longitudinal axis of the nose boom, and
   (b) controlling the angles of rotation of the strakes about said axis, whereby the asymmetry of the forebody vortices and the forebody forces resulting therefrom may be controlled.

15. The method of claim 14 wherein the strakes are mounted on a nose boom member mounted on the nose boom for rotation about the boom axis and forming the forwardmost portion of the forebody, whereby in step (b), the angle of the pair of strakes is controlled in unison.

16. The method of claim 14 wherein the strakes are each mounted on a separate forebody nose member mounted for rotation about the boom axis, whereby in step (b), the angle of each of the pair of strakes may be separately controlled.

17. The method of claim 14 wherein in step (b), the angles of the strakes are controlled in a predetermined manner based on current flight conditions.

18. The method of claim 14 wherein in step (b), the angles of the strakes are controlled in a predetermined manner based on current flight conditions including a yaw parameter.

19. The method of claim 18 wherein the yaw parameter is yaw rate.

20. The method of claim 14 wherein in step (b), the angles of the strakes are controlled in a predetermined manner based at least in part on current flight commands.

21. The method of claim 20 wherein in step (b), the angles of the strakes are controlled as part of a feedback loop based at least in part on the difference in current flight commands and current flight conditions.

22. The method of claim 20 wherein in step (b), the angles of the strakes are controlled as part of a feedback loop based at least in part on the difference in current flight commands and current flight conditions including a yaw parameter.

23. The method of claim 22 wherein the yaw parameter is yaw rate.

24. The method of claim 14 wherein in step (b), the angles of the strakes are dithered.

25. The method of claim 14 wherein in step (a), the size and location of the strakes are selected so that the degree of asymmetry of the vortices is a monotonic function of the angles of rotation of the strakes.

26. The method of claim 14 wherein in step (a), the size and location of the strakes are selected so that the forebody contribution to the aircraft yawing moment is a monotonic function of the angles of rotation of the strakes.

27. An aircraft having:
   an aircraft forebody having a longitudinal axis and extending forward to define the nose of the aircraft;
   a pair of strakes on the nose of the aircraft forebody, both strakes being rotatable about a common axis that is approximately aligned with the longitudinal axis of the aircraft forebody; and means for controlling the angles of rotation of the strakes about said axis, whereby the asymmetry of the forebody vortices and the forebody forces resulting therefrom may be controlled.

28. The aircraft of claim 27 wherein the strakes are mounted on a forebody nose member mounted on the forebody for rotation about said axis and forming the forwardmost portion of the forebody contour, and further comprising means for controlling the angle of the pair of strakes in unison.

29. The aircraft of claim 27 wherein the strakes are each mounted on a separate forebody nose member mounted for rotation about said axis and together forming the forwardmost portions of the forebody contour, and further comprising means for separately controlling the angle of each of the pair of strakes.

30. The aircraft of claim 27 further comprising means for controlling the angles of the strakes in a predetermined manner based on current flight conditions.

31. The aircraft of claim 27 further comprising means for controlling the angles of the strakes in a predetermined manner based on current flight conditions including a yaw parameter.

32. The aircraft of claim 31 wherein the yaw parameter is yaw rate.

33. The aircraft of claim 27 further comprising means for controlling the angles of the strakes in a predetermined manner based at least in part on current flight commands.

34. The aircraft of claim 33 wherein the angles of the strakes are controlled as part of a feedback loop based at least in part on the difference in current flight commands and current flight conditions.

35. The aircraft of claim 33 further comprising means for controlling the angles of the strakes as part of a feedback loop based at least in part on the difference in current flight commands and current flight conditions including a yaw parameter.

36. The aircraft of claim 35 wherein he yaw parameter is yaw rate.

37. The aircraft of claim 27 further comprising means for dithering the angles of the strakes.

38. The aircraft of claim 27 wherein the size and location of the strakes are selected so that the degree of asymmetry of the vortices is a monotonic function of the angles of rotation of the strakes.

39. The aircraft of claim 27 wherein the size and location of the strakes are selected so that the forebody contribution to the aircraft yawing moment is a monotonic function of the angles of rotation of the strakes.

40. The aircraft of claim 27, further comprising a nose boom attached to the nose of the aircraft, wherein the strakes are mounted on the nose boom and are adapted to be simultaneously rotated about the nose boom.

41. The aircraft of claim 27, further comprising a nose boom attached to the nose of the aircraft, wherein the strakes are mounted on the nose boom and are adapted to be rotated about the nose boom independent of each other.

* * * * *

UNITED STATES PATENT AND TRADEMARK OFFICE
CERTIFICATE OF CORRECTION

PATENT NO. : 5,207,397
DATED : May 4, 1993
INVENTOR(S) : Ng et al.

It is certified that error appears in the above-indentified patent and that said Letters Patent is hereby corrected as shown below:

Column 9 at line 6 change "mall" to -- small --.

Signed and Sealed this

Sixteenth Day of May, 1995

Attest:

BRUCE LEHMAN

Attesting Officer

Commissioner of Patents and Trademarks